United States Patent [19]

Ashby

[11] Patent Number: 4,644,427
[45] Date of Patent: Feb. 17, 1987

[54] DISKETTE LOADING APPARATUS

[76] Inventor: Harrel D. Ashby, Rte. 2, Box 274A, Hinton, Okla. 73047

[21] Appl. No.: 588,936

[22] Filed: Mar. 13, 1984

[51] Int. Cl.⁴ .................. G11B 17/12; B65G 59/00
[52] U.S. Cl. ............................ 360/98; 369/194; 414/125; 414/128
[58] Field of Search ............... 360/98; 369/194; 414/125, 128, 280, 330

[56] References Cited

U.S. PATENT DOCUMENTS

| | | | |
|---|---|---|---|
| 3,846,836 | 11/1974 | Masse et al. | 360/98 |
| 3,861,689 | 1/1975 | Nagaoka | 274/10 R |
| 4,170,030 | 10/1979 | Castrodale et al. | 360/98 |
| 4,271,489 | 6/1981 | Siryj et al. | 369/38 |
| 4,286,790 | 9/1981 | Siryj et al. | 369/36 |
| 4,481,618 | 11/1984 | Makayama | 369/194 |
| 4,510,542 | 4/1985 | Aggeler | 360/98 |

OTHER PUBLICATIONS

A brochure of Pre-Mechs Company.
A brochure of Certel Incorporated.

Primary Examiner—Robert S. Tupper
Attorney, Agent, or Firm—Bill D. McCarthy

[57] ABSTRACT

An improved diskette loading apparatus comprising a rack assembly; a guide assembly which guides a diskette into a dropping path defining a drop chute; and a disk drive apparatus which sequentially receives the falling diskettes. A pick assembly sequentially pulls the diskettes into the drop chute which features a cam shoulder that rotates diagonally racked diskettes to position the pulled diskettes such that they can fall unhindered through the drop chute into the disk drive apparatus. A passage directing assembly directs the diskette once released by the disk drive apparatus for selected routing for bin compartment sorting.

14 Claims, 11 Drawing Figures

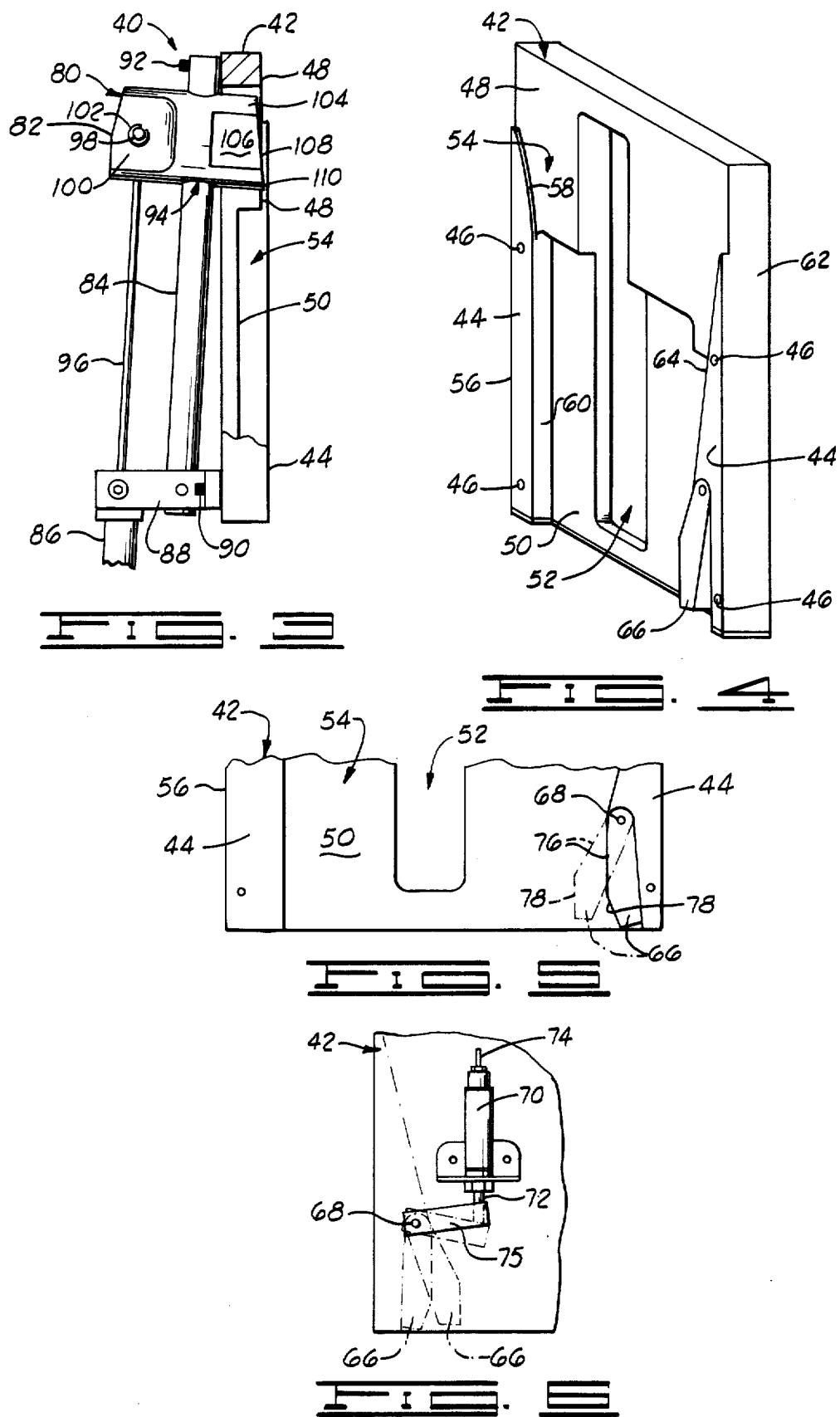

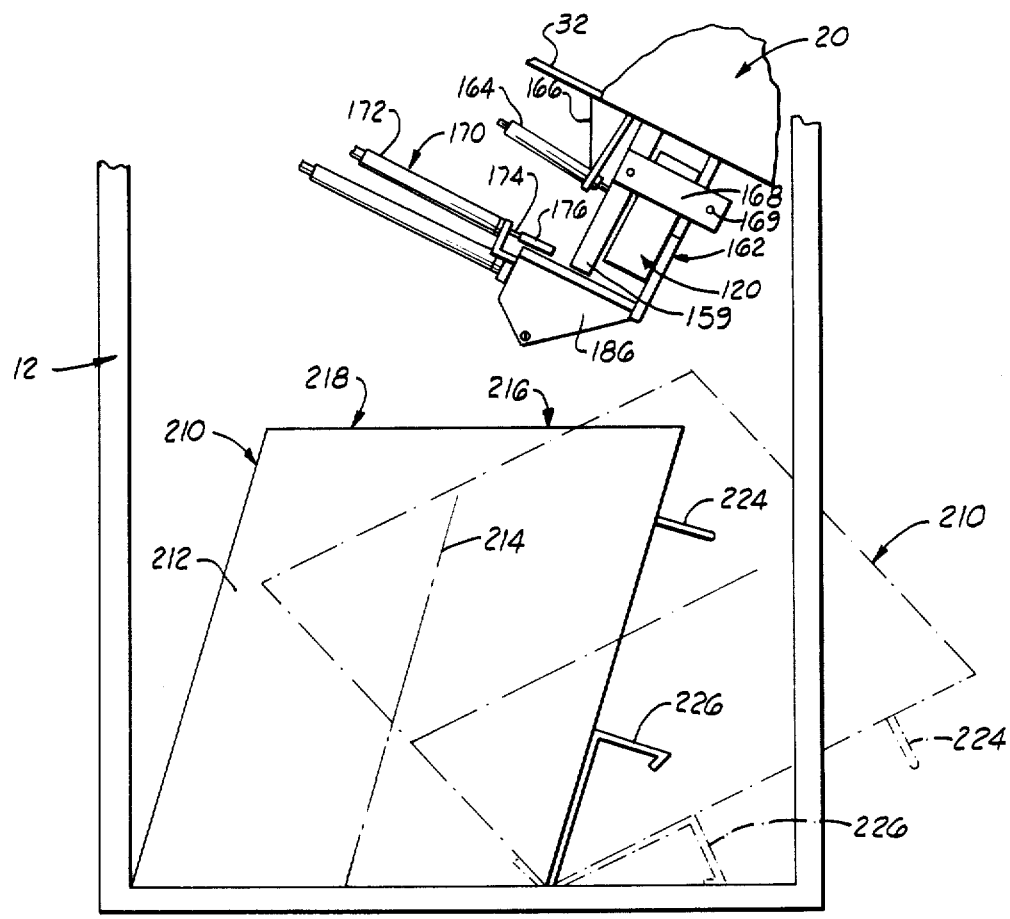
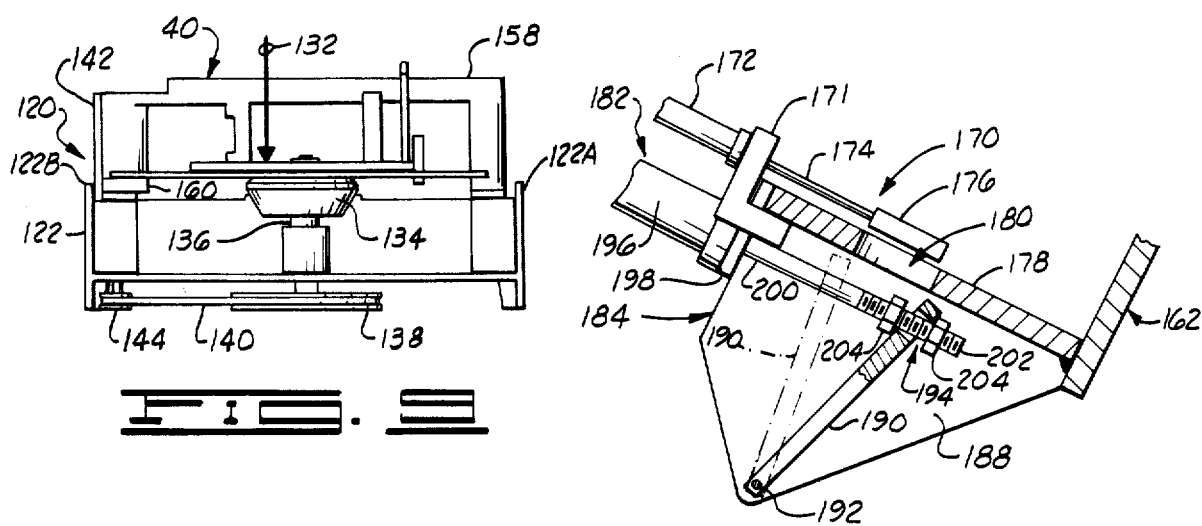

4,644,427

DISKETTE LOADING APPARATUS

BACKGROUND

1. Field of Use

The present invention relates generally to the field of computer peripheral support equipment, and more particularly but not by way of limitation, to processing equipment for handling a high volume of jacketed diskettes.

2. Discussion

With the onrushing development of the computer into an era now frequently referred to as the computer age, the development of computer technology has included a host of associated equipment often referred to as peripherals. Such peripherals include material handling devices that have been developed as the need has arisen to manufacture computers and related equipment to meet the increasing demand of the consuming public.

One such area of need involves the mass handling of diskettes that are used as memory devices for a class of computers generally known as mini- or microcomputers. These diskettes, also called floppy disks, are comprised of magnetically coated vinyl disks, sometimes hereinbelow referred to as disk media, that are very flexible and fragile. Because of this, the disk media is placed in a protective jacket cover which is provided with centrally located holes for access to the disk media which has a drive pole that is shaped to be placed over the driving spindle of a disk drive apparatus. The disk media's jacket is sufficiently large to permit unimpeded rotation of the disk media while the jacket is maintained in a stationary position in the disk drive apparatus.

The disk media contains a material that is selectively magnetized in a computer readable format and serves as both temporary and permanent memory bank for minicomputers. A support industry has rapidly evolved to supply diskettes containing preset computer instructions, known as software, to users of minicomputers. Also, blank diskettes are sold for word processing and other data handling uses in the large number of minicomputers that are used by small and large businesses alike.

Diskettes must be manufactured and tested in mass rates in order to meet this need. Because of the high quality standards imposed on each diskette, each one must be individually tested by a computer write/read technique wherein a pre-established format is magnetically imprinted on the disk media, this format is then read back for accuracy, and the disk media is erased to become a blank diskette. A large number of blank diskettes are then processed to magnetically imprint a selected set of software instructions/commands thereon. It becomes a matter of necessity that these diskettes be handled by devices that move them into and out of engagement with testing and software writing systems while maintaining the physical integrity of the media.

Diskette loading devices have been designed to hold such diskettes in bulk and to individually feed the diskettes into and out of engagement with the disk drive peripherals that are manufactured by many companies both in this country and abroad. These prior art diskette loading devices, such as that manufactured by Media Systems Technolooy, Inc. of Irvine, Calif., have operated by using sets of revolving pinch wheels that grip the jacket edges and move the diskette in a selected path. One set of the wheels is disposed to insert a diskette into the nesting channel of a disk drive apparatus, and another set of wheels is disposed to grippingly engage the diskette to reverse its path in order to retrieve the diskette from the disk drive apparatus. Once retrieved, the diskette is routed via such pinch wheels to sorting bins.

While such diskette loaders have generally met the need for rapid handling of diskettes, experience has shown that they require a high degree of attention to maintain them in good operating condition. Furthermore, it is not uncommon to find that the useful life of such loaders is very short. The economics of replacement soon indicate that the maintenance of worn machines is prohibitive unless rebuilt extensively.

There is a need for an improved diskette loader design that has a minimum of moving parts in order to provide low cost maintenance while accurately handling large numbers of diskettes, and also while achieving long and useful machine life. The present invention presents such a design.

SUMMARY OF THE INVENTION

The present invention provides an improved diskette loading apparatus comprising a rack assembly which holds a plurality of jacketed diskettes; a guide assembly which guides a diskette into a dropping path defining a drop chute; and a disk drive assembly which sequentially receives the diskettes for interaction therewith, the guide means further characterized as having guide rails which guide the diskettes into and through the disk drive assembly. Further, the guide assembly operates to selectively direct the diskettes path as it is permitted to drop from the disk drive apparatus.

An object of the present invention is to provide an improved diskette loading apparatus which handles jacketed diskettes in a superior manner so as to increase the efficiency of processing same.

Another object of the present invention, while achieving the above stated object, is to provide an improved diskette loading apparatus having a reduced number of moving parts so as to minimize operational difficulties.

Yet another object of the present invention, while achieving the above stated objects, is to provide an improved diskette loading apparatus which is constructed in a manner which minimizes downtime and maintenance costs.

One other object of the present invention, while achieving the above stated objects, is to provide an improved diskette loading apparatus which is readily repairable and thus maintainable by semi-skilled maintenance personnel.

Other objects, advantages and features of the present invention will be apparent from the following detailed description when read in conjunction with the drawings and appended claims.

BRIEF DESCRIPTION OF THE DRAWINGS

FIG. 3 is a side elevational, partial cutaway view of the upper portion of the guide assembly and pick assembly comprising portions of the diskette loading apparatus of FIG. 1.

FIG. 4 is an isometric view of the guide plate portion of the guide assembly of FIG. 3.

FIG. 5 is a partial, elevational view of the guide plate portion shown in FIG. 4.

FIG. 6 is a partial, elevational view of the reverse side of the guide plate portion of FIG. 4.

FIG. 9. is an end view of the disk drive apparatus of FIG. 8.

FIG. 10 is a semi-detailed schematic representation of the bin assembly which forms a part of the diskette loading apparatus of FIG. 1.

FIG. 11 is a side elevational view in partial cutaway detail of the passage directing portion of the guide assembly contained as part of the diskette loading apparatus of FIG. 1.

DISCUSSION

Figure 1:
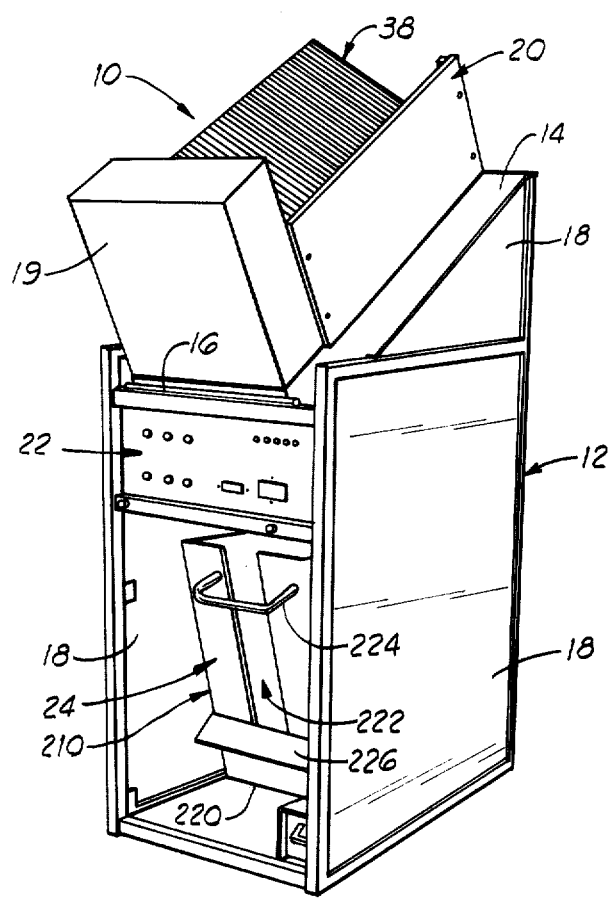
FIG. 1 is an isometric view of a diskette loading apparatus constructed in accordance with the present invention.

Referring to the drawings, and particularly to FIG. 1, shown therein is a diskette loading apparatus 10 constructed in accordance with the present invention. For purposes of clarity, the same numerals denoting the various components of the diskette loading apparatus 10 as shown in FIG. 1 will be used throughout the drawing figures.

The diskette loading apparatus 10 has a support frame 12 comprised of a number of vertical and horizontal metal struts that are welded together to form a rigid support box type structure. An inclined support plate 14 is supported on top of the support frame 12 and is connected thereto via a hinge member 16 in order to permit access to the interior of the support frame 12 by rotating the support plate 14 forward. An appropriate hand set screw (not shown) is used to secure the opposite end of the support plate 14 to the back of the support frame 12. If desired, a series of appropriately shaped closure panels 18 can be provided to partially enclose the sides and back of the support frame 12. Also, a covering shroud member 19 is provided over a portion of the guide assembly described hereinbelow.

Supported on top of the inclined support plate 14 is a rack assembly 20 to be described fully below. Also shown in FIG. 1 is the face plate of a control unit 22, and a bin assembly 24, also to be described below.

Figure 2:
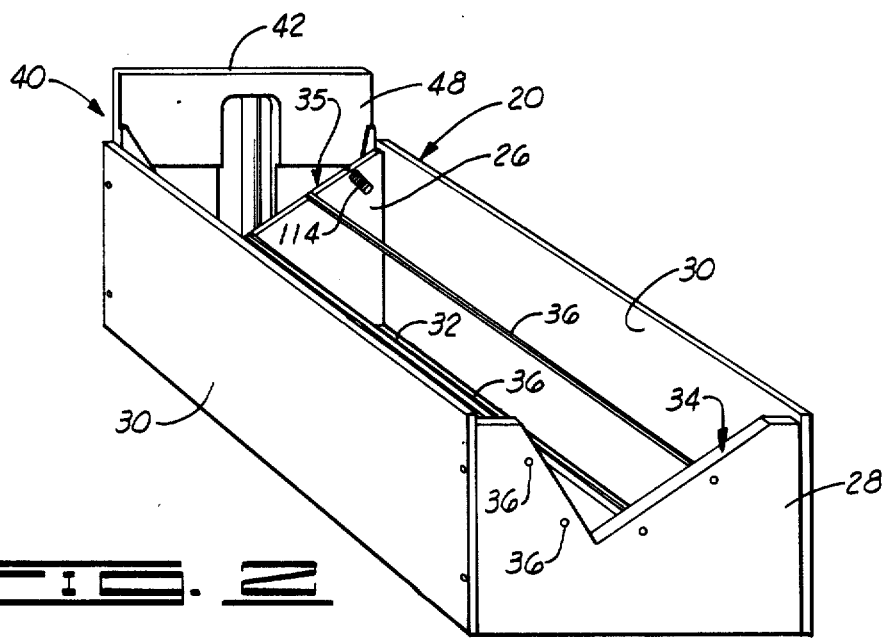
FIG. 2 is an isometric view of the rack assembly of the diskette loading apparatus shown in FIG. 1.

The rack assembly 20, shown in FIG. 2 in more detail, comprises a first end plate 26 and a second end plate 28 which are attached to a pair of side members 30 and a bottom plate 32 to form a diskette container for open access loading. The first end plate 26 and the second end plate 28 are formed to have notches 34 and 35 respectively, and a plurality of support bars 36 extend between and are supported by the end plates. The near ends of the support bars 36, as shown in FIG. 2, are pressed into appropriately sized holes extending through the end plate 28 just below the notch 34. The distal ends of the support bars 36 are pressed into tightly fitting notches along the top edges of the notch 34 so that the top surfaces of the support bars 36 are disposed above the notch 35.

The angle formed by the notches 34, 35 is a right angle and sized substantially to conform to the corner shape of the diskette to be loaded. While the present invention is not limited to a particular size of diskette, the present invention will be illustrated with the generally accepted standard square shaped jacket which contains a circular shaped disk media. The spatial disposition of the support bars 36 is selected to sidingly support the diskettes on two edges thereof in the manner depicted in FIG. 1 which shows a large number (approximately 200) of jacketed diskettes loaded on edge in the rack assembly 20. The inclined support plate 14 holds the rack assembly 20 in a sufficiently inclined position such that gravity causes the diskettes to slide down toward and over the upper edges of the notch 35 in the first end plate 26 as each is permitted to be dispensed therefrom.

Disposed at the lower end of the rack assembly 20 and attached to the first end plate 26 is the upper portion of a guide assembly 40 that serves to guide the jacketed diskettes through a selected path as the diskettes are caused to be dispensed one at a time from the bulk loaded rack assembly 20. This process will become clear as the component parts of the guide assembly 40 are now described with reference to FIGS. 3–7.

The guide assembly 40 has a guide plate 42 that has a first planar surface 44 that is disposed adjacent to the first end plate 26 of the rack assembly 20 and secured thereto via bolts (not shown) that extend through holes 46 through the guide plate 42, such bolts being threadingly engageable with aligning holes in the first end plate 26.

The guide plate 42 also has a recessed second planar surface 48 and a further recessed third planar surface 50 that are substantially parallel to the first planar surface 44. A slot 52 is disposed through and extends nearly the full length of the guide plate 42. The reliefs provided by the previously mentioned planar surfaces 44, 48 and 50 form a downwardly extending drop chute 54 as follows. At one side 56 of the guide plate 42 and between the first planar surface 44 and the second planar surface 48 is formed a cam shoulder 58, and between the first planar surface 44 and the third planar surface 50 is a first guide shoulder or wall 60. At the other side 62 of the guide plate 42, the ridge 64 formed between the first planar surface 44 and the third planar surface 50 extends angularly downwardly, and near the lower end thereof, a retractable tab member 66 is pivotally mounted to the third planar surface 50 by an arbor pin 68 that is bearingly supported for rotation by, and extends through, the guide plate 42. Mounted on the back side of the guide plate 42 via an appropriate bracket is a pneumatically operable extendible cylinder device 70. The extendible cylinder 70 is of conventional design and has an internal piston movement (not shown) that selectively extends and retracts its rod member 72 when attached to a controlled pressurized air supply (not shown) at its end 74. A lever member 75 has one of its ends connected to the pivotal pin 68 and has its distal end connected to the rod member 72. Depending upon the internal bias of the extendible cylinder device 70, air pressure is selectively applied to the extendible cylinder 70 to cause pivotation of the lever member 75 to selectively cause the retractable tab member 66 to assume a first retracted position as depicted in the partial view shown in FIG. 5, or to assume a second extended position as depicted in phantom detail in FIG. 5.

The tab member 66 has an angularly extending outer edge that has a first edge portion 76 and a second edge portion 78. When the tab member 66 is disposed in its first retracted position, the first edge portion 76 is parallel with the first guide wall 60, and when the tab member 66 is in its second extended position, the second edge portion 78 is parallel with the first guide wall 60.

The above described configuration of the guide plate 42 provides the drop chute 54 defined as the open area between the end of the first end plate 26 (of the rack assembly 20) and the third planar surface 50 of the guide plate 42, and bounded on the sides by the first guide wall 60 and a second guide wall defined by (1) the first edge portion 76; or (2) the second edge portion 78 of the tab member 66 when in its first retracted position or second extended position, respectively.

Returning to FIG. 3, the purpose of the slot 52 in the guide plate 42 will become clearer. Shown therein is an elevational side view of a pick assembly 80 which serves to dispense the diskettes individually from the rack assembly 20. The pick assembly 80 comprises a pick head member 82, a traveling rail 84 and a pick drive cylinder 86. The traveling rail 84 is held stationary at a predetermined angle relative to the guide plate 42 by a bracket 88 which is secured to the back side of the guide plate 42 via screws 90, the bracket 88 grippingly supporting the lower end of the traveling rail 84. At the upper end of the traveling rail 84, a screw 92 extends through an aperture in the traveling rail 84 and is threadingly engaged in an appropriately located hole in the guide rail 42.

The pick head member 82 has a rail engaging bore 94 through its mid section which slidingly receives the traveling rail 84 therethrough for selective sliding movement of the pick head member 82 along the traveling rail 84. Preferably, both the traveling rail 84 and the interior surfaces of the rail engaging bore 94 are polished and accurately machined for smooth yet precision relative movement therebetween. The pick drive cylinder 86 has an extendible rod 96 that is connected to the rear portion of the pick head member 82 which preferably has a slot (not shown) for receiving the distal end (not shown) of the extendible rod 96, and a pin 98 extends through axially aligned holes in flatted portions 100 to extend across the slot. The distal end of the extendible rod 96 can be provided with a yoke connector that loops over the pin 98 spanning the slot, and the pin 98 can be secured in place via conventional locking spring rings such as at 102 for quick disassembly in order to remove the guide assembly 40 from service.

The pick head member 82 has a front or pick portion 104 that is flatted on its sides as at 106 to extend into the slot 52 of the guide plate 42. The width dimension of the pick portion 104 is determined so as to have a free sliding fit in the slot 52, and the travel of the pick head member 82 is determined via the travel distance of the extendible rod 96 of the pick drive cylinder 86, between its extended and retracted positions, to move from near the top of the slot 52 as shown in FIG. 3 to near the bottom of the slot 52. The reason for the angle of the traveling rail 84 relative to the back side of the guide plate 42 will now be made clear. The angle of the traveling rail 84 will be determined by the dimensions of the bracket 88 since the upper end of the traveling rail 84 is attached directly to the guide plate 42. As shown in FIG. 3 which depicts the pick head member 82 in its uppermost position on the traveling rail 84, the pick portion 104 extends into the slot 52 and its front surface 108 is tapered so that its lower front edge 110 that serves as a jacket engaging edge is brought into pulling engagement with the lip of the clearing or access hole in the diskette jacket when the pick head member 82 is in its upper position, and the angular disposition of the traveling rod 84 causes the slight retraction of the pick portion 104 within the slot 52 as the pick head member 82 travels to its lower position on the traveling rail 84 by the retraction of the extendible rod 96 into the body portion of the pick drive cylinder 86, which occurs with selective pressurizing or depressurizing the conventional pick drive cylinder via a source of pressurized air. That is, as the pick head member 82 is caused to move away from the guide plate 42 in its downward travel along the traveling rail 84, the front surface 108 thereof is also retracted relative to the second planar surface 48 of the guide plate 42, and as a consequence thereof, the jacket engaging edge 110 is moved out of pulling engagement with the lip of the jacket access hole of the diskette so as to release the jacket into unhindered dropping engagement of the diskette in the drop chute 54.

Figure 7:
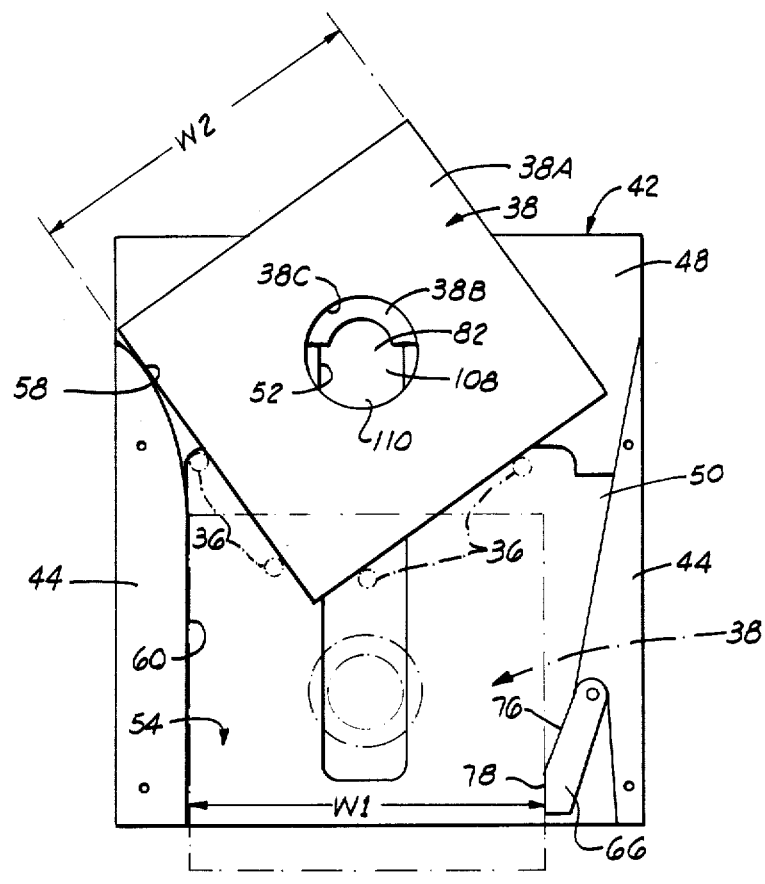
FIG. 7 is an elevational view of the guide plate portion of FIG. 4 showing a jacketed diskette in full and phantom views depicting the dropping path of the diskette.

Turning now to FIG. 7, shown therein is the guide plate 42 with one of the diskettes 38 shown in the position which it is held by the rack assembly 20 relative to the guide plate 42 when it is in position to be the next diskette to be pulled into dropping engagement in the drop chute 54. The cross-section of the support bars 36 are shown in phantom view to illustrate their relative positions at the first end plate 26 which is not shown in FIG. 7. The diskette 38 has a diskette cover 38A and an internally disposed disk media 38B which is accessible through an access hole 38C. The portion of the disk media 38B is removed in this view so as to show the position of the pick head member 82 in the slot 52. In this position, the jacket engaging edge 110 is shown to be in pulling engagement with the lower portion of the lip of the jacket's access hole 38C.

As will be apparent in the view shown in FIG. 7, the angular disposition of the diskettes 38 when held in bulk by the rack assembly 20 relative to the guide plate 42 is determined such as to present the diagonal dimensions of the diskettes to the opening of the drop chute 54. The width dimension W1 has been preset in the construction of the guide plate 42 so as to just clearingly receive the width W2 of the diskette 38; this permits the diskette 38 to fall through the drop chute 54 only when the diskette 38 is turned to have its bottom edge extensive across the drop chute 54 in the manner depicted by the phantom view of the diskette 38 in FIG. 7.

The turning of the diskette 38 so as to permit its entrance into the drop chute 54 is accomplished by the cam shoulder 58 of the guide plate 42. As shown in FIG. 7, one side edge of the diskette 38 is brought into close proximity to the cam shoulder 58 as it becomes the diskette held nearest the guide plate 42 via the rack assembly 20. As the pick head member 82 is raised within the slot 52 to engage the lip of the access hole 38C of the diskette 38A, the downward movement of the diskette 38 as it is pulled into the drop chute 54 causes the side edge of the diskette 38 to bear against the cam shoulder 58. As this occurs, the diskette 38 is turned by the cam shoulder 58 so that it assumes the falling position depicted by the phantom view, the width W2 thereof being so determined so as to permit unhindered falling of the diskette 38 through the drop chute 54.

It will be recognized that, in addition to the pulling force on the diskette 38 exerted by the action of the pick head member 82 as it is caused to travel downwardly via the above described sequence, the weight of other diskettes held in the rack assembly 20 will be partially borne by the diskette 38 directly next to the guide plate 42, creating frictional contact between it and the diskette actively being pulled into the drop chute 54. To prevent this frictional force from moving this next diskette, a diskette retarding device 114 is supported near the upper edge of the notch 35 in the first end plate 26 of the rack assembly 20, as shown in FIG. 2. The diskette retarding device 114 is a commercially available bolt mechanism having a spring loaded detent tip (not shown). Extending through the first end plate 26, the detent tip of the diskette retarding device 114 presses lightly against the second planar surface 48 of the guide plate 42 just below the upper surface of the notch 35. As a diskette is pulled into the drop chute 54 via the action of the pick head member 82, this diskette lifts the detent tip of the diskette retarding device 114 and easily slides past it under pulling control of the pick head member 82. When the diskette is finally released from engagement with the pick head member 82, the falling diskette has passed from contact with the diskette retarding device 114. However, the following diskette, not yet engaged by the pick head member 82 but being pulled via frictional contact with the diskette being pulled by the pick head member 82, will not have sufficient force exerted thereon to pass the diskette retarding device 114. While not essential to the operation of the present invention, this feature does assist in preventing an occasional jamming of the drop shut 54 that might be caused by unwanted multiple entries of diskettes therein.

Figure 8:
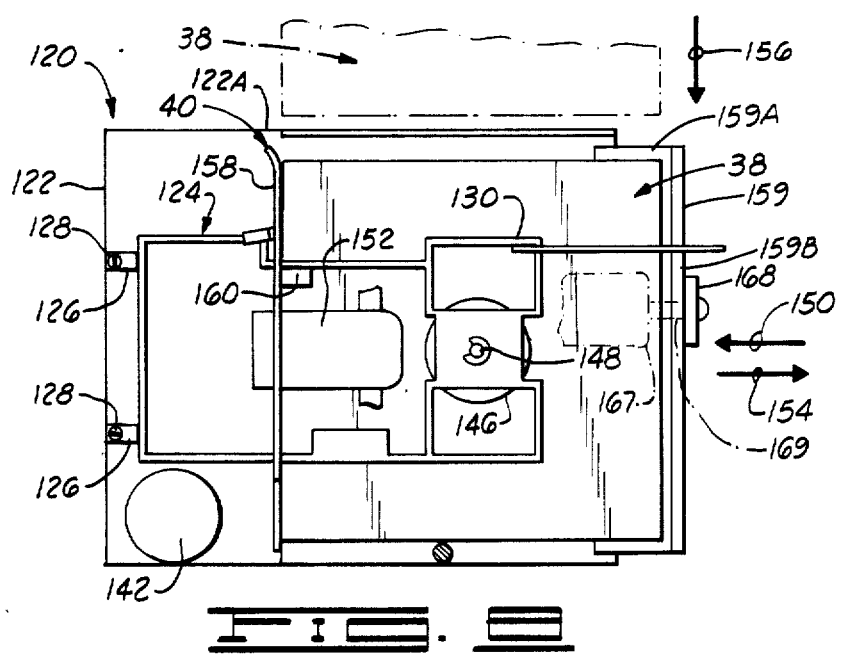
FIG. 8 is a front, elevational view of the disk drive apparatus contained in the diskette loading apparatus of FIG. 1.

Having described the top portion of the guide assembly 40, the attention of the reader will next be directed to FIG. 8 wherein is shown a disk drive apparatus 120 of the type used in the diskette loading apparatus 10 of the present invention. The physical location of the disk drive apparatus 120 and its functional relationship to the diskette loading apparatus 10 will be further described hereinbelow, but its specific function and operational characteristics relative to the diskette 38 will first be undertaken. The disk drive apparatus 120 is a conventionally available computer peripheral manufactured by several companies, such as Magnetics Peripherals, Inc. of Oklahoma City, Okla.; the Qume Corporation of San Jose, Calif.; and the Shugart Corporation of Sunnyvale, Calif. While there are differences in the construction details of the disk drive apparatuses manufactured by these corporations, all of them, together with all other such manufacturers, make their disk drive apparatuses to conform to the standards of the American National Standards Institute to accept and drive standard diskettes.

Depicted in FIGS. 8 and 9 in semi schematic elevational and end views, respectively, is the model sold by Magnetics Peripherals, Inc. as its Part No. 77680001. A brief description of the disk drive 120, together with the modifications thereto required for the present invention, will be adequate for an understanding of the present disclosure. The disk drive apparatus 120 has a frame 122 and a gate member 124 that is attached to the frame 122 via a pair of leaf springs 126, attached via screws 128. The bias setting of the leaf springs 126 is predetermined to cause the gate member 124 to rotatingly swing away from the frame 122 such that its end 130 is disposed a predetermined distance from the frame 122. The application of external force, such as depicted by the arrow 132 in FIG. 9, will cause the gate member 124 to pivotally swing on its spring connectors 126 to assume the closed position depicted in this view.

The disk drive apparatus 120 further comprises a hollow faced drive wheel 134 that is mounted on one end of a sprindle 136 bearingly supported by the frame 122. The other end of the sprindle 136 has a sheave 138 that is rotated by a flexible drive belt 140. A drive motor 142 is supported by the frame 122 and has a sheaved drive shaft 144 that is looped by the drive belt 140 in driving engagement therewith. In operation, the drive wheel 134 is continuously rotated.

The disk drive apparatus 120 also has a disk engaging wheel 146 that is mounted on a sprindle 148 that is bearingly supported for free rotation by the end 130 of the gate member 124. The shape of the disk engaging wheel 146 is determined to be extensible into the center hole of the disk media 38B so that the disk media will rotate with the disk engaging wheel 146 when they are brought into pressing engagement. The external shape of the disk engaging wheel 146 is normally tapered, and the internal shape of the hollow faced drive wheel 134 mated thereto such that the disk engaging wheel 146 is caused to be rotated when the disk engaging wheel 146 is pressed into engagement with the drive wheel 134 in the closed position of the gate member 124 depicted in FIG. 9.

In commercial practice, all such disk drive apparatuses as represented by the disk drive apparatus 120 are designed to accept a standard diskette 38 for end insertion. That is, when the diskette is inserted from the direction depicted by the arrow 150 in FIG. 8, it is guided by appropriate rail mechanisms on the frame 122 such that the hole of the disk media 38B is approximately beneath the disk engaging wheel 146; when the gate member 124 is closed, it causes the disk engaging wheel 146 to engage the disk media 38B and the drive wheel 134 such that rotation of the disk media within the jacket 38A (which remains stationary via the action of another pressing mechanism not shown) is effected. A magnetic head 152 is provided for selectively encoding, reading or erasing the imprinted format on the disk media 38B. Once the required interaction with the diskette is finished, the diskette 38 is conventionally removed from the disk drive apparatus by moving it in the opposite direction depicted by the arrow 154 such as by pinch wheel mechanisms or the like.

The present invention departs from this afore described end loading of the conventional disk drive apparatuses while retaining the use of such apparatuses. As noted, the gate member 124 of the disk drive apparatus 120 is a gate that swings away from the frame. This permits sufficient side accessiblity for insertion of the diskettes 38 from the direction depicted by the arrow 156 and for the removal of the diskettes 38 in the same direction 156; that is, for flow through processing of the diskettes 38 by the disk drive apparatus 120.

While there are structural differences in the disk drive apparatuses made by the various manufacturers, each such conventional disk drive apparatus can be modified by common machine methods to accept side loading/unloading processing of the jacketed diskettes. Generally, any side molding or built-up surfaces must be removed from these prior art disk drive apparatuses so that an entry/departure plane is achievable from the sides 122A and 122B of the frame 122. This may require a milling operation on some prior art disk drive apparatuses. Additionally, the disk drive apparatus is modified with guide rails as part of the afore mentioned guide assembly 40 which includes a first edge rail member 158 that is bolted to the frame 122 and disposed to edge guide the diskette 38 as it is moved into and out of the disk drive apparatus 120. A second edge rail member 159, described hereinbelow, is provided to guide the other edge of diskette 38. Also, the guide assembly 40 includes a plurality of top and bottom support members such as at 160 to generally guide the diskette 38.

In practice, the modified disk drive apparatus 120 is disposed in the angular position shown in FIG. 10 by a support bracket 162 that is mounted to extend from beneath the bottom plate 32 of the rack assembly 20. A conventional pneumatic cylinder 164 is supported in near proximity to the disk drive apparatus 120 via a support bracket 166 that is also mounted to the underside of the bottom plate 32. The pneumatic cylinder 164 is positioned such that its extendible rod abuts against the end 130 of the gate member 124. When pressurized, the extension of the extendible rod of the pneumatic cylinder 164 presses against the gate member 124 to move it to its closed position, and when the pneumatic cylinder 164 is depressurized, the gate member 124 is permitted to swing open via its support leaf springs 126.

The second edge rail member 159 is supported by a pneumatic cylinder 167 (a portion of which is shown in phantom lines in FIG. 8) mounted on the support bracket 162. The second edge rail member 159 is an L-shaped member that has a support leg portion 159A that is disposed beneath the diskette 38 and an edge guiding leg portion 159B that extends normal to the leg portion 159A and is disposed along the edge of the diskette as shown to generally limit the lateral displacement of the diskette 38. A supporting arm 168 is connected to the leg portion 159B and in turn is supported by the end of the extendible rod 169 of the pneumatic cylinder 167. When the pneumatic cylinder is in its retracted mode, the inner edge of the edge guiding leg portion 159B is generally aligned with the second edge portion 78 of the tab member 66; and when the pneumatic cylinder 167 is extended, the inner edge of the edge guiding leg portion 159B is generally aligned with the first edge portion of the tab member 66. Thus, with the coordinated positioning of the retractable tab member 66 and the second edge rail member 159, via their respective pneumatic cylinders 70 and 167, the second edge rail member 159 presents a guiding edge that is aligned beneath the active guiding edge of the tab member 66 whether extended or retracted for the purpose described hereinbelow.

Supported at the lower end of the support bracket 162 is a further portion of the guide assembly 40. Specifically, the guide rails associated with the disk drive apparatus 120 is complemented by a disk drive stop assembly 170 that serves to selectively block the dropping path of the diskette 38 so as to position it to be operated on by the disk drive apparatus 120, and then to permit the diskette 38 to drop from the disk drive apparatus 120. The disk drive stop assembly 170 comprises a conventional pneumatic cylinder 172 supported by a bracket 171 secured to the support bracket 162, the pneumatic cylinder 172 having an extendible rod 174. Supported on the distal end of the extendible rod 174 is a platform member 176. The support bracket 162 has a bottom plate 178 that has a transverse slot 180 through which the diskette is passable once released by the disk drive apparatus 120. In the closed position of the disk drive stop assembly 170, the extendible rod 174 of the pneumatic cylinder 172 is extended so as to place the platform member 176 over the slot 180. In this position, the platform member 176 is also below the dropping path of the diskette 38 in a position to hold the fallen diskette in the disk drive apparatus 120 in a manner and position depicted in FIG. 8, thus serving as a stop gate for the disk drive apparatus 120. In the open position of the disk drive stop assembly 170, the extendible rod 174 is retracted, opening the slot 180 and permitting the diskette to fall therethrough as it is released by the disk drive apparatus 120.

The guide assembly 40 also comprises a passage directing mechanism 182 which is supported by the bottom plate 178 of the support bracket 162 and serves to direct a diskette dropping from the disk drive apparatus 120 into a selected bin compartment described hereinbelow. The passage directing mechanism 182 comprises a support bracket assembly 184 that has a pair of paralled end lugs 186 and 188 that are welded to and extend downwardly from the bottom plate 178. A laterally extending passage directing plate 190 is pivotally supported between the lugs 186, 188 via axle pins 192 that extend from each end of the passage directing plate 190 and extend into appropriately located, aligned holes in the end lugs 186 and 188. A hole 194 is located near one end of the passage directing plate 190 as shown in FIG. 11. The passage directing mechanism 182 also comprises a conventional pneumatic cylinder 196 that is supported by a bracket 198 that is secured to the bottom plate 178 of the support bracket 162. The pneumatic cylinder 196 has an extendible rod 200 that has a threaded distal end 202 which passes through the hole 194 in the passage directing plate 190. A pair of spacer nuts 204 are supported on the distal end 202 on either side of the passage directing plate 190 as shown.

When the extendible rod 200 is retracted, diskettes passing through the slot 180 are permitted to drop in a first path into a bin, and when the extendible rod 200 is extended, the passage directing plate 190 serves to deflect the falling diskette into a second path. As shown in FIG. 10, disposed beneath the support bracket assembly 184 is a bin assembly 210 that has a generally rectangularly shaped bin 212 having a middle partition wall 214 (shown in phantom lines) to divide the bin into a front compartment 216 and a rear compartment 218. The bin 212 is supported on the frame 12 and has a hinge connector 220 so as to be pivotable to an unloading position depicted by the phantom outline in FIG. 10. The front wall of the bin 212 can be provided a slot 222 as shown in FIG. 1 for easy access to collected diskettes, and similar slots (not shown) can be provided in the middle wall partition 214 and the back wall of the bin 212 for the same purpose. Also, a handle 224 and a pivot stop member 226 can be secured to the front wall of the bin 212.

The control unit 22, which is of conventional design with pneumatic or electronic controls to sequentially operate the afore mentioned pneumatic cylinders, need not be described herein insofar as its structure is concerned, for the reason that the sequential control circuitry is well known to persons of ordinary skill in this and related arts. However, the desired operational sequence will be provided herein. Diskette loaders are conventionally utilized and controlled by a host computer which controls the disk drive apparatus. An alternative to this is to provide an intellegent micro computer within the control unit, if such is desired, in order to relieve the host computer from the burden of controlling the sequencing signals. Of course, the present invention does not require such sophistication of control circuitry, and can be used with simple sequencing control, including the use of conventional, manually operated switches. This is pointed out merely to demonstrate the range of utilization of the disk loading apparatus 10 of the present invention.

Before proceeding with the operational sequence, it is well at this point to provide a brief comment on the purpose of the tab member 66 that is selectively positionable in a first retracted position and in a second extended position via the pneumatic extendible cylinder 70 in the manner described above. The reason for this feature, in practice, is to accommodate the processing of both sealed and open jackets. As discussed earlier, a flat, circular disk media is placed within a jacket member. This jacket, in the manner of an envelope, has an open side which is provided with a flap. Once the disk media is inserted, the flap is folded down and sealed. However, economics of diskette manufacturer dictate the testing of the disk media before the flap is sealed so that a jacket containing a faulty disk media can be reused simply by discarding the faulty disk media and replacing it with another one. In practice, a diskette loader must be able to process both open jackets and sealed jackets. Since the width dimension of the open jacket is greater than when it is sealed, the drop chute 54 of the present invention is made to accommodate both the sealed and open widths of the jackets. Accordingly, the tab member 66 is placed in its first retracted position to process diskettes having open jackets, and the tab member 66 is placed in its second extended position to process diskettes having sealed jackets. Further, the second edge rail member 159 is positioned via its supporting pneumatic cylinder 167 so as to have the inner edge of the edge guiding leg portion 159B in alignment with the guiding edge of the tab member 66 as described hereinabove.

Preferably, electronic or pneumatic sequencing control involves the placement of a host computer program into its operational mode which will signal the control unit 22 when a diskette is to be loaded into the disk drive apparatus 120. The control unit 22 will cause the pressurization of the pick drive cylinder 86 to raise the pick head member 82 to its uppermost position on the traveling rail 84. At this point in time, the tab member 66 has been preset via selective pressurization of the pneumatic extendible cylinder 70 to select the width of the drop chute 54, this being determined on the basis of whether the diskette loading apparatus 10 is to process diskettes having open or sealed jackets as described above. The rack assembly 20 has been loaded with about 200 to 250 diskettes 38, and the lead diskette is in place at the first end plate 26 when the pick head member 82 is raised.

At this time in the cycle, the platform member 176 is caused to be beneath the disk drive apparatus 120 via the extension of the extendible rod 174 of the pneumatic extendible cylinder 172. The gate member 124 of the disk drive apparatus 120 is in its open position as the extendible rod of the pneumatic extendible cylinder 164 is caused to assume its retracted mode. The driving motor 142 is placed in its operating mode to rotate the drive wheel 134. Also, at this time, the passage directing mechanism 182 is actuated so that the extendible rod 200 of the pneumatic extendible cylinder 196 is retracted, causing the passage directing plate 190 to be placed in the position depicted in phantom lines in FIG. 11 so that the falling diskettes will be directed in the first pathway and will fall into the front compartment 216 of the bin 212.

Next, the pick drive cylinder 86 is caused to retract so as to pull the pick head member 82 toward its lower position on the traveling rail 84. As this is occurring, the jacket engaging edge 110 of the pick head member 82 engages the lip portion 38C of the jacket 38A to pull the lead diskette 38 held by the rack assembly 20 into the drop chute 54. As this is occurring, the diskette 38 is caused to press against the cam shoulder 58 of the guide plate 42, whereby the pulled diskette 38 is caused to turn squarely into the dropping chute 54. With continued lowering of the pick head member 82, the angular disposition of the traveling rail 84 causes the partial retraction of the pick head member 82 relative to the slot 52 in the guide plate 42 so that the jacket engaging edge 110 no longer projects beyond the second planar surface 48 of the guide plate 42, whereupon the diskette 38 is released by the pick head member 82. The released diskette 38 at this point is free falling and drops into the disk drive apparatus 120, guided by the edge rail member 158 and support members 160, and comes to rest upon the closed platform member 176.

The pneumatic cylinder 164 is pressurized to extend its extendible rod against the end 130 of the gate member 124 to close it upon the diskette 38 that is now within the disk drive apparatus 120, causing the disk engaging wheel 146 to be inserted into the driving hole of the disk media 38B and then into the drive wheel 134 which is already rotating. This action causes the disk media to be rotated in its stationary jacket. After interaction by the magnetic head 152 to write, read and/or erase the format imprinted on the disk media, the pneumatic cylinder 172 is caused to retract its extendible rod 174 and the platform member 176 attached thereto; the pneumatic cylinder 164 is retracted, opening the gate member 124 and permitting the diskette 38 to drop through the slot 180. If the disk media 38B is found to be acceptable, the pneumatic cylinder 196 is retained in its retracted mode, and the diskette 38 drops into the front compartment 216 of the bin 212. On the other hand, if the diskette 38 is found to be defective, the pneumatic cylinder 196 is extended, rotating the passage directing plate 190 beneath the slot 180, thus directing the faulty diskette into the rear compartment 218.

As the diskette 38 is being thusly dropped into the appropriate bin compartment, the pick head member 82 is again raised to commence the next cycle; that is, the pick head member 82 is raised to a position to hook the jacket engaging edge 110 thereof over the lip portion of the access hole 38C of the jacket 38A so as to pull the next diskette 38 into the drop chute 54 when the pick head member is again pulled down. This cycle is repeated on a frequency as required to feed the diskettes 38 to the disk drive apparatus 120. Since the diskettes 38 are caused to fall substantially in a plane passing through the disk drive apparatus 120, the diskette loading apparatus 10 can operate very rapidly and with high repeatability, with very little down time normally required.

While not illustrated in the drawings, it is within the contemplation of the present invention to provide for multiple disk drive apparatuses 120 to be incorporated in series relationship such that a diskette 38 can be directed via falling action from a first disk drive apparatus into a second disk drive apparatus. Once the falling plane is determined, and a diskette is turned into the drop chute in the manner described hereinabove, the controlled falling of the diskette to route it to selected operating stations becomes a matter of directing the falling path as desired.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. An improved diskette loading apparatus, comprising:
    rack means for holding a plurlaity of the jacketed diskettes;
    guide means for guiding a jacketed diskette in a selected dropping path, the guide means having a drop chute through which the diskette is selectively permitted to drop;
    pick means for sequentially pulling the diskette into dropping engagement with the drop chute; and
    disk drive means for sequentially receiving and interacting with the diskette media of each jacketed diskette, the guide means comprising guide rail means associated with the disk drive means for guiding the diskette selectively in the disk drive means as it is permitted to drop from the disk drive following interaction therewith.

2. An improved diskette loading apparatus comprising:
    rack means for holding a plurality of jacketed diskettes on diagonal edge;
    guide means for guiding a jacketed diskette in a selected dropping path, the guide means having a drop chute through which the diskette is selectively permitted to drop;
    pick means for sequentially pulling the diskette into dropping engagement with the drop chute, the guide means also comprising cam means for turning the diskette into side orientation as the pick means is caused to pull the diskette into the drop chute, the width of the drop chute determined to accept a diskette oriented to have a selected side to be the leading portion of the diskette as it passes through the drop chute; and
    disk drive means for sequentially receiving and interacting with the diskette media of each jacketed diskette, the guide means comprising guide rail means associated with the disk drive means for guiding the diskette selectively through the disk drive means.

3. The diskette loading apparatus of claim 2 wherein the pick means comprises:
    a pick head having a jacket engaging edge and a rail engaging bore therethrough;
    a traveling rail disposed to extend through the rail engaging bore and slidingly supporting the pick head;
    pick drive means for selectively moving the pick head along the traveling rail, the traveling rail having a first end portion and a second end portion, the traveling rail disposed so that the jacket engaging edge is brought into pulling engagement with the lip of an access hole in the jacket when the pick head is moved to the first end portion of the traveling rail and so that the jacket engaging edge releases the lip of the access hole as the pick head is moved toward the second end portion of the traveling rail, the diskette thereby being pulled into dropping engagement with the drop chute, and whereby the diskette is pulled into turning engagement with the cam means so that the selected side of the diskette is the leading portion thereof as the diskette selectively drops through its dropping path in the drop chute.

4. The diskette loading apparatus of claim 3 wherein the guide means further comprises:
    disk drive stop means supported for blocking the guide rail means to selectively block the dropping path of the diskette in the closed position so that the diskette will be in position for driving engagement with the disk drive means when the disk drive means is actuated to rotate the disk media of the diskette, and to permit the diskette to exit the disk drive means when the disk drive stop means is in the open position.

5. The diskette loading apparatus of claim 4 wherein the guide means further comprises:
    passage directing means disposed beneath the disk drive stop means for directing a diskette dropping from the disk drive means into a selected one of a plurality of bin compartments disposed beneath the disk drive means.

6. The diskette loading apparatus of claim 5 wherein the guide means further comprises:
    a guide plate having a first guide wall;
    a second guide wall assembly supported by the guide plate in substantial parallel relation with the first guide wall and defining the drop chute therebetween, the second guide wall assembly having a retractable portion movable between a first position and a second position, the drop chute having a width of a first predetermined dimension when the retractable portion is in its first position and the drop chute having a width of a second predetermined dimension when the retractable portion is in its second position; and
    drop chute width determining means for moving the retractable portion of the second guide wall assembly selectively to one of the first position and the second position.

7. The diskette loading apparatus of claim 6 wherein the rack means comprises:
    a rack frame having first and second end plates;
    a first set of guide rails extending between and supported by the first and second end plates;
    a second set of guide rails extending between and supported by the first and second end plates, the second set of guide rails disposed substantially parallel to the first set of guide rails, the first and second sets of guide rails spatially disposed to support a plurality of diskettes such that the diskettes are supported by the first guide rails on one selected side and by the second guide rails on adjoining normal sides of the diskettes, the first and second guide rails supported by the frame at a predetermined angle such that the diskettes gravity slide toward the lower end plate as the diskettes are sequentially pulled into the drop chute by the pick head.

8. The diskette loading apparatus of claim 7 wherein the rack means further comprises:
    bias means supported by the lower end plate of the rack plates for preventing gravity feed of the diskettes into the drop chute until the pick head pulls gripped diskette a predetermined distance along the lower end plate.

9. In a diskette loading apparatus in which jacketed diskettes are dispensed from a rack assembly holding plural jacketed diskettes to a disk drive apparatus, the improvement comprising:
- guide means for guiding the jacketed diskettes in a selected dropping path, the guide means having a drop chute through which the jacketed diskettes are individually permitted to drop into the disk drive apparatus; and
- pick means for sequentially pulling the jacketed diskettes into dropping engagement with the chute and then releasing the diskette, the rack assembly holding the plural jacketed diskettes on diagonal edge, and the guide means comprising a cam means for turning the jacketed diskette into side orientation as the pick means pulls the jacketed diskette into the dropping chute, the width of the drop chute determined to accept a jacketed diskette oriented to have a selected side as the leading portion of the diskette as it passes through the drop chute.

10. The improvement of claim 9 wherein the disk drive sequentially receives the jacketed diskettes in a path therethrough and wherein the guide means comprises:
- guide rail means for guiding the jacketed diskette selectively in the disk drive apparatus as it is permitted to drop from the disk drive apparatus following interaction therewith.

11. In a diskette loading apparatus in which jacketed diskettes are dispensed from a rack assembly holding plural jacketed diskettes to a disk drive apparatus, each jacketed diskette having a jacket bearing a disk media and having an access hole for driving access to the disk media, the improvement comprising:
- guide means for guiding the jacketed diskettes in a selected dropping path, the guide means having a drop chute through which the jacketed diskettes are individually permitted to drop into the disk drive apparatus; and
- pick means for sequentially pulling the jacketed diskettes into dropping engagement with the chute, the rack assembly holding the plural jacketed diskettes on diagonal edge, and the guide means comprising a cam means for turning the jacketed diskette into side orientation as the pick means pulls the jacketed diskette into the dropping chute, the width of the drop chute determined to accept a jacketed diskette oriented to have a selected side as the leading portion of the diskette as it passes through the drop chute, the pick means comprising:
  - a pick head having a jacket engaging edge and a rail engaging bore therethrough;
  - a traveling rail disposed to extend through the rail engaging bore and slidingly supporting the pick head; and
  - pick drive means for selectively moving the pick head along the traveling rail, the traveling rail having a first end portion and a second end portion, the traveling rail disposed so that the jacket engaging edge is brought into pulling engagement with the lip of an access hole in the jacket when the pick head is moved to the first end portion of the traveling rail and so that the jacket engaging edge releases the lip of the access hole as the pick head is moved toward the second end portion of the traveling rail, the diskette thereby being pulled into dropping engagement with the drop chute, and whereby the diskette is pulled into turning engagement with the cam means so that the selected side of the diskette is the leading portion thereof as the diskette selectively drops through its dropping path in the drop chute; and
wherein the disk drive sequentialy receives the jacketed diskettes in a path therethrough and wherein the quide means comprises:
- guide rail means for guiding the jacketed diskette selectively through the disk drive apparatus.

12. The improvement of claim 11 wherein the guide means further comprises:
- disk drive stop means supported for selectively blocking the path of the dropping path of the jacketed diskette and having a closed position and an open position such that the jacketed diskette will be held thereby within the disk drive apparatus in the closed position of the disk drive stop means and such that the jacketed diskette will be permitted to drop from the disk drive apparatus in the open position of the disk drive stop means.

13. The improvement of claim 12 wherein the guide means further comprises:
- passage directing means disposed beneath the disk drive stop means for directing a diskette dropping from the disk drive apparatus into a selected one of a plurality of bin compartments disposed beneath the disk drive apparatus.

14. The improvement of claim 13 wherein the guide means further comprises:
- a guide plate having a first guide wall;
- a second guide wall assembly supported by the guide plate in substantial parallel relation with the first guide wall and defining the drop chute therebetween, the second guide wall assembly having a retractable portion movable between a first position and a second position, the drop chute having a width of a first predetermined dimension when the retractable portion is in its first position and the drop chute having a width of a second predetermined dimension when the retractable portion is in its second position; and
- drop chute width determining means for moving the retractable portion of the second guide wall assembly selectively to one of the first position and the second position.

* * * * *

UNITED STATES PATENT AND TRADEMARK OFFICE
CERTIFICATE OF CORRECTION

PATENT NO. : 4,644,427

DATED : February 17, 1987

INVENTOR(S) : Harrel D. Ashby

It is certified that error appears in the above-identified patent and that said Letters Patent is hereby corrected as shown below:

In heading [56], References Cited, 6th patent cited, the word "Makayama" should read --Nakayama--. In column 10, line 13, the word "paralled" should read --parallel--; in column 10, line 61, the word "intellegent" should read --intelligent--. In column 13, line 13, the word "plurlaity" should read --plurality--. In column 16, line 19, the word "quide" should read --guide--.

Signed and Sealed this

Twenty-first Day of June, 1988

Attest:

DONALD J. QUIGG

Attesting Officer     Commissioner of Patents and Trademarks